United States Patent
Hockey

(10) Patent No.: US 9,002,909 B2
(45) Date of Patent: Apr. 7, 2015

(54) TRACKING MARKED DOCUMENTS

(75) Inventor: Alyn Hockey, Basingstoke (GB)

(73) Assignee: Clearswift Limited, Reading (GB)

( * ) Notice: Subject to any disclaimer, the term of this patent is extended or adjusted under 35 U.S.C. 154(b) by 524 days.

(21) Appl. No.: 11/912,842

(22) PCT Filed: Apr. 27, 2006

(86) PCT No.: PCT/GB2006/001565
§ 371 (c)(1),
(2), (4) Date: Jun. 5, 2008

(87) PCT Pub. No.: WO2006/114643
PCT Pub. Date: Nov. 2, 2006

(65) Prior Publication Data
US 2009/0132539 A1    May 21, 2009

(30) Foreign Application Priority Data
Apr. 27, 2005 (GB) .................................. 0508567.5

(51) Int. Cl.
G06F 7/00 (2006.01)
G06F 21/62 (2013.01)
G06F 17/30 (2006.01)

(52) U.S. Cl.
CPC ...... G06F 21/6218 (2013.01); G06F 17/30011 (2013.01)

(58) Field of Classification Search
USPC .................................. 707/606, 714, 797, 821
See application file for complete search history.

(56) References Cited

U.S. PATENT DOCUMENTS

| | | | |
|---|---|---|---|
| 5,052,040 A | | 9/1991 | Preston et al. |
| 5,319,776 A | | 6/1994 | Hile et al. |
| 5,495,533 A | * | 2/1996 | Linehan et al. ................ 713/155 |
| 5,917,910 A | * | 6/1999 | Ishiguro et al. ................. 705/57 |
| 6,101,507 A | * | 8/2000 | Cane et al. ............. 707/999.201 |
| 6,192,407 B1 | * | 2/2001 | Smith et al. .................... 709/229 |
| 6,327,611 B1 | * | 12/2001 | Everingham .................. 709/206 |
| 6,662,212 B1 | * | 12/2003 | Chandhok et al. ............ 709/206 |
| 6,732,101 B1 | * | 5/2004 | Cook ................................... 1/1 |
| 6,785,712 B1 | * | 8/2004 | Hogan et al. .................. 709/206 |

(Continued)

FOREIGN PATENT DOCUMENTS

FR 2 853 102 10/2004
WO WO 00/22605 4/2000

(Continued)

OTHER PUBLICATIONS

McDowall, R.D., Digital Signatures, LG GC Europe Feb. 2001, pp. 1-4.*

(Continued)

*Primary Examiner* — Cheyne D Ly
(74) *Attorney, Agent, or Firm* — Alston & Bird LLP

(57) ABSTRACT

When data is stored on a computer, or subsequently, originator preferences relating to the data are stored in a database, for example in a network. When another user subsequently makes a request for processing of the received data, or a modified copy of the data, it is determined whether the requested processing is consistent with any stored originator preferences, and the requested processing is permitted only if it is consistent with the stored originator preferences. The preferences may relate to saving, copying or retransmitting the data. The originator may be notified of any processing operations that are carried out.

18 Claims, 4 Drawing Sheets

(56) References Cited

U.S. PATENT DOCUMENTS

| | | | |
|---|---|---|---|
| 6,816,884 B1 * | 11/2004 | Summers | 709/206 |
| 6,954,792 B2 * | 10/2005 | Kang et al. | 709/229 |
| 7,032,030 B1 * | 4/2006 | Codignotto | 709/246 |
| 2002/0032623 A1 * | 3/2002 | Wheeler et al. | 705/28 |
| 2002/0042796 A1 * | 4/2002 | Igakura | 707/205 |
| 2002/0052849 A1 | 5/2002 | McCutchen et al. | |
| 2002/0078087 A1 * | 6/2002 | Stone | 707/511 |
| 2002/0078134 A1 * | 6/2002 | Stone et al. | 709/202 |
| 2002/0174010 A1 * | 11/2002 | Rice, III | 705/14 |
| 2002/0188638 A1 * | 12/2002 | Hamscher | 707/530 |
| 2003/0009365 A1 * | 1/2003 | Tynan et al. | 705/9 |
| 2003/0074578 A1 * | 4/2003 | Ford et al. | 713/200 |
| 2003/0135576 A1 * | 7/2003 | Bodin | 709/213 |
| 2004/0186859 A1 * | 9/2004 | Butcher | 707/200 |
| 2005/0108336 A1 * | 5/2005 | Naick et al. | 709/206 |
| 2005/0192966 A1 * | 9/2005 | Hilbert et al. | 707/10 |
| 2005/0256898 A1 * | 11/2005 | Akagawa et al. | 707/102 |
| 2006/0130154 A1 * | 6/2006 | Lam et al. | 726/30 |
| 2007/0073773 A1 * | 3/2007 | Walker et al. | 707/104.1 |

FOREIGN PATENT DOCUMENTS

| | | |
|---|---|---|
| WO | WO 00/22771 | 4/2000 |
| WO | WO 00/58811 | 10/2000 |
| WO | WO 00/58963 | 10/2000 |
| WO | WO 00/62265 | 10/2000 |
| WO | WO 01/50691 A2 | 7/2001 |
| WO | WO 01/50691 A3 | 7/2001 |
| WO | WO 02/082271 A1 | 10/2002 |
| WO | WO 02/086803 A1 | 10/2002 |
| WO | WO 02/098042 A2 | 12/2002 |
| WO | WO 03/096585 A1 | 11/2003 |

OTHER PUBLICATIONS

Choudhury A. K. et al: "Copyright Protection for Electronic Publishing Over Computer Networks" IEEE Network, IEEE Service Center, New York, NY, US vol. 9, No. 3, May 1, 1995, pp. 12-20.

International Search Report Dated Jul. 19, 2006.

Brin S et al: "Copy Detection Mechanisms for Digital Documents*" SIGMOD Record, ACM, New York, NY, US, vol. 24, No. 2, Jun. 1, 1995, pp. 398-409 XP000527686 p. 398, col. 1, line 1-p. 400, col. 1, line 16.

Google Groups Email from Paul Rubin dated Feb. 20, 1995, downloaded at http://groups.google.co.uk/>; Apr. 30, 2005; 1 page.

* cited by examiner

| | | | | |
|---|---|---|---|---|
| Documents | Suggestion.txt | | | |
| Memo re Sales.doc | Server | ENG03 | Path | C:\Notes |
| Suggestion.txt | Size | 23056 | Created | 28-Dec-2004 18:24 |
| Reorganisation.doc | Track | RestrictToWorkGroup | | |
| Suggestion 2.doc | | | | |
| | Location | | User | Date moved |
| eMails | | | | |
| Rick's Performance | Server: ENG01 | | | |
| Reorganisation | | | | |
| Sales targets | C:\FSMITH\MAIL\mail594.eml | | FS | 24-Dec-04 12:18 |
| | G:\BACKUP\Fs\MAIL\m594.eml | | FS | 30-Dec-04 04:22 |
| | | | | |
| | Server: Jane PC | | | |
| | | | | |
| | C:\Eudora\msg661.toc | | JD | 24-Dec-04 12:42 |
| | C:\Projects\staffing\Frank.doc | | JD | 24-Dec-04 12:50 |
| | | | | |
| | Server: ADMIN01 | | | |
| | | | | |
| | C:\HJONES\MAIL\mail882.eml | | HJ | 24-Dec-04 12:52* |

Figure 4

TRACKING MARKED DOCUMENTS

This invention relates to a system and a method for tracking marked documents, or computer-readable files of any type, within a network computer system.

Network computer systems allow the easy transfer of files from one user to another, with clear benefits to the organizations operating such computer systems. However, network computer systems can also be used to transfer documents to unauthorized or unintended recipients.

Systems have been proposed in order to deal with this problem.

For example, WO 01/50691 describes a controlled secure email delivery mechanism whereby data is held with a message, and that data is used by the mail reading program to limit the onward transmission of that message. However, this has the disadvantage that, even if the email client limits printing or forwarding of the message, there is apparently nothing to prevent the user from copying the text and pasting it into a new message.

EP 08940194 describes a way of limiting distribution of documents that have been paid for, by embedding payment information within the data and ensuring that any program that accesses this data checks the payment authorization. One potential disadvantage with this type of system is that, since the protection data is embedded within the data, it can potentially be tampered with by the recipient. In the case of EP 08940194, strong cryptography is used to ensure that the protection data held within the document cannot be tampered with. However, the requirement to use strong cryptography in this way is a disadvantage in itself.

Systems also exist which allow a computer to identify particular types of electronic file, such as viruses and spam email, and restrict the user's ability to process those files. However, those limits on the user's ability are not set by the originators of the files, but are imposed subsequently, for example by the writer of an anti-virus program.

For example, U.S. Pat. No. 5,319,776 describes a system for detecting viruses in computer data streams. Specifically, data in transit between a source computer and a destination computer is tested against search strings representing the signatures of multiple known computer viruses. When a virus is detected, the data is prevented from remaining on the destination computer storage medium.

According to a first aspect of the present invention, there is provided a method of controlling data processing, the method comprising:
a) receiving user-specific originator preferences relating to data; and
storing said originator preferences and a representation of the data in a database;
b) allowing access to said data by other users; and
c) in response to a request by any user for processing of a file:
identifying whether the file contains data identical to or sufficiently similar to said data; and, if so:
determining the identity of the requesting user;
determining from the database whether said requested processing is consistent with any stored originator preferences relating to the requesting user; and
permitting the requested processing only if said processing is consistent with the stored originator preferences.

According to a second aspect of the present invention, there is provided a client computer device, comprising:
means for requesting originator preferences relating to a created file;
means for forming an indication of a content of said file; and
means for sending receiving originator preferences, in association with said indication of the content of said file, to a database for storage.

According to a third aspect of the present invention, there is provided a computer program product, for use on a client computer device connected to a computer network, the computer program product containing code for causing said device to:
request originator preferences relating to a created file;
identify an originator of the file;
form an indication of a content of said file; and
send received originator preferences, in association with said indication of the content of the file, over said computer network to a network server.

According to a fourth aspect of the present invention, there is provided a client computer device, comprising:
means for receiving a request for processing of a file;
means for forming an indication of a content of the file;
means for sending the indication of the content of the file, and an identity of a user of the client computer device, to a server device; and
means for performing the requested processing only if permitted by said server.

According to a fifth aspect of the present invention, there is provided a server computer device, comprising:
means for receiving originator preferences relating to a first file, in association with an indication of a content of said first file;
means for receiving notification from a user of a request for processing of a second file, in association with an indication of a content of said second file, and an indication of the identity of the user;
means for determining from said indications whether said contents of said first and second files are identical or sufficiently similar;
means for retrieving received originator preferences, if said contents of said first and second files are identical or sufficiently similar; and
means for permitting the requested processing of said second file only if it is consistent with any retrieved received originator preferences relating to that user.

Thus, the storage of user-specific originator preferences on a server means that the users are not able to override the originator preferences by tampering with received documents.

FIG. 4 illustrates a user interface presented to a user in operation of the system in accordance with the invention.

DETAILED DESCRIPTION OF PREFERRED EMBODIMENTS

Figure 1:
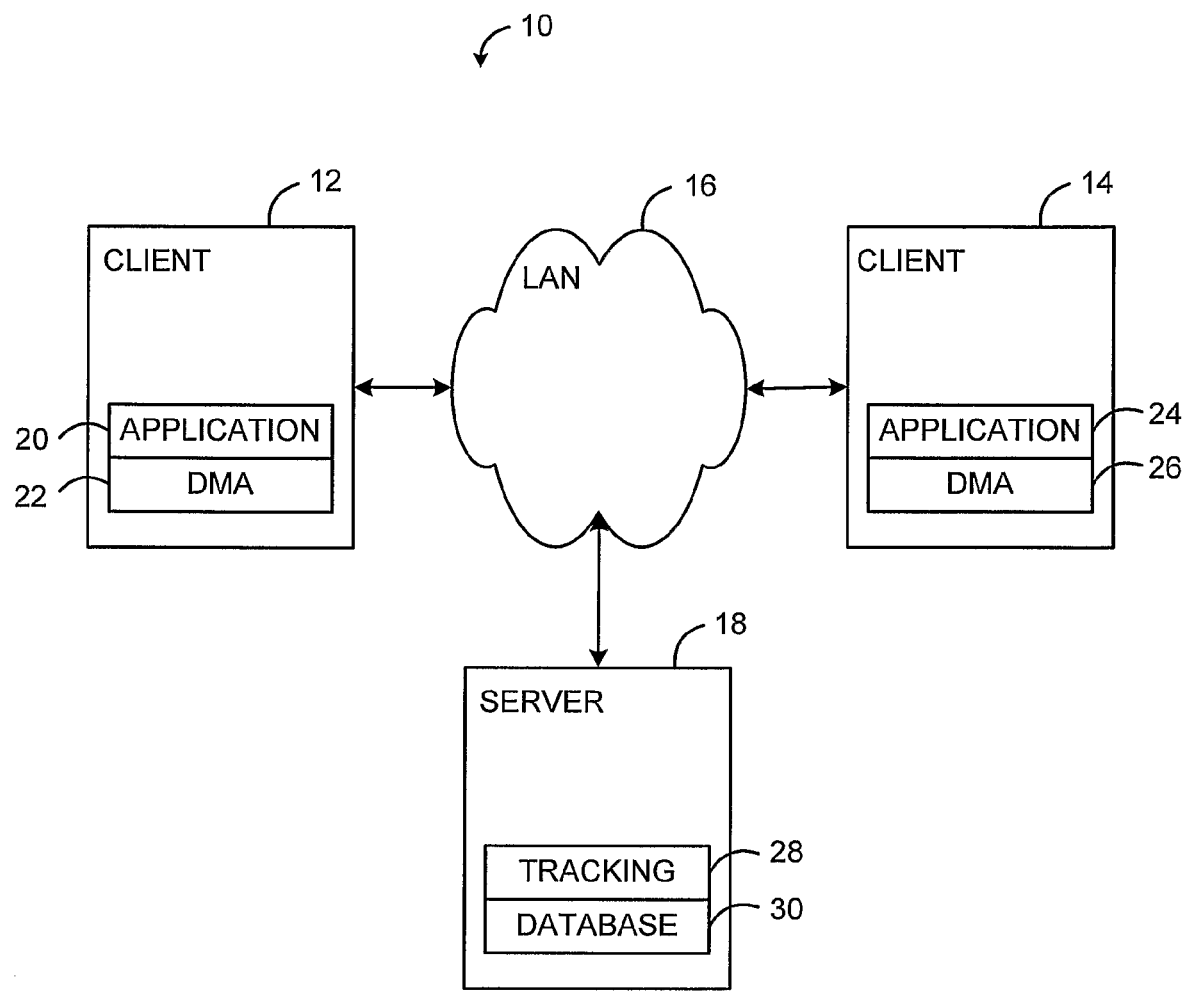
FIG. 1 is a block schematic diagram, showing a computer system in accordance with an aspect of the present invention.

FIG. 1 is a schematic diagram, showing a computer system 10. The system 10 includes two client computers 12, 14, connected over a local area network (LAN) 16, which also includes a server computer 18. It will be appreciated that the network 10 may well have more than two client computers connected to it. However, the invention can be sufficiently described with reference to a network containing two client computers.

The first client computer 12 can run application software 20, and has an associated document management agent (DMA) 22. The second client computer 14 can run application software 24, and has an associated document management agent (DMA) 26. The server 18 runs tracking software 28, and has access to a database 30. The database 30 is shown as part of the server 18, but can instead be provided on a separate device accessible from the server 18. The functionality of the server 18, as described below, can be provided on a network server machine, or on a separate machine only dealing with this functionality. One or more such server can be used to provide the required functionality.

In a corporate or other network environment, the system administrator can take steps to ensure that a client computer will not operate if the document management agents 22, 26 are removed or disabled.

The invention is described herein with reference to an example in which the application software 20, 24 running on the client computers 12, 14, comprises an email program. However, the invention is applicable to all operations in which files can be transferred from one user to another, or can be made available to multiple users.

Figure 2:
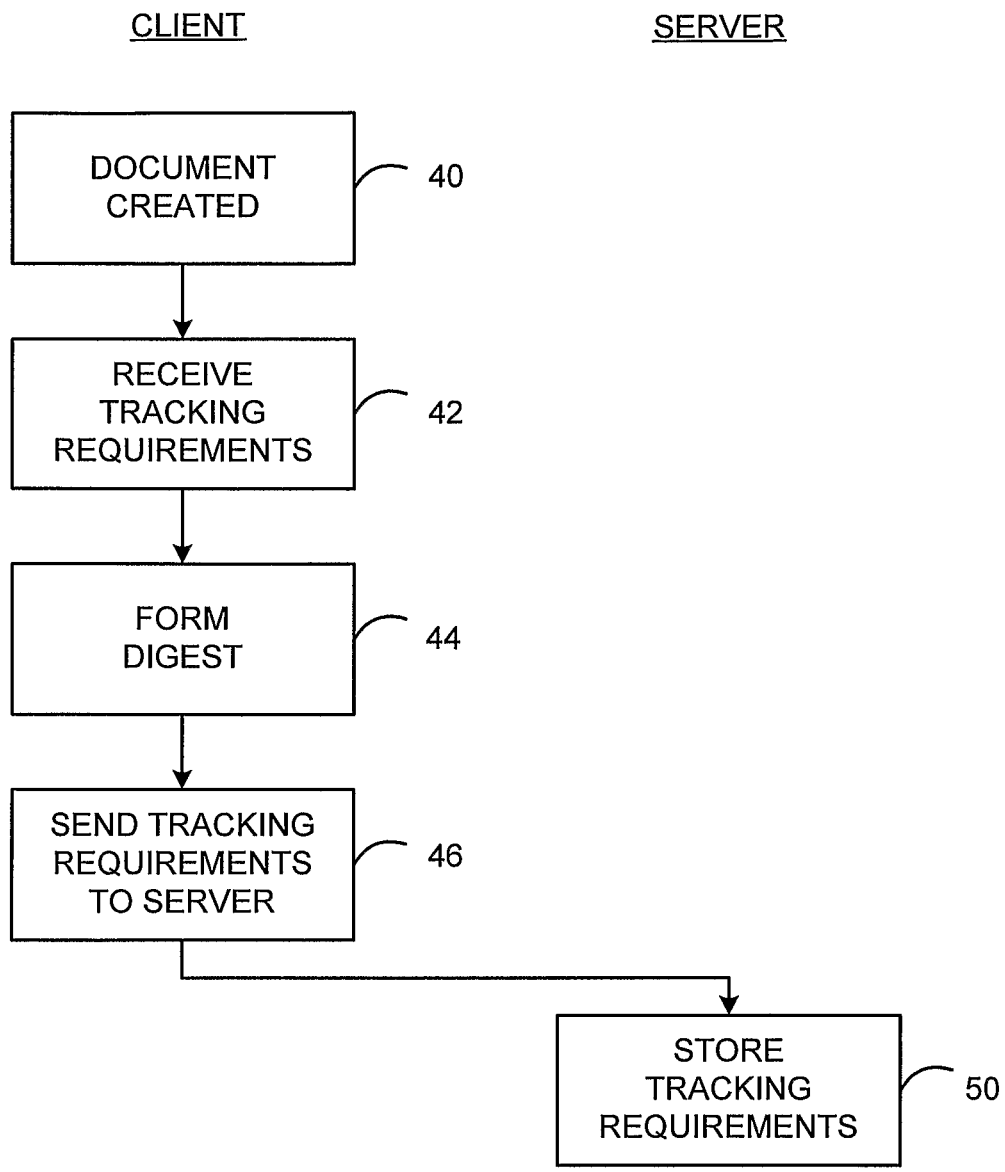
FIG. 2 is a flow chart, showing steps performed in a client device, and in a server, of the computer system of FIG. 1, at a first stage in a process in accordance with an aspect of the present invention.

FIG. 2 is a flow chart, illustrating a first phase of the operation of the system 10. In step 40 of the process, a document is created by a first originating user, and a document movement request is made in the application software 20 on the client computer 12. Although the term "document" is used herein, it will be appreciated that the invention is applicable to any form of computer file, such as an email message, an email attachment, a word processing document, a spreadsheet, or a presentation. Further, although the invention is specifically described with reference to its use in an email program, the document movement request may be made in many types of software.

Further, while FIG. 1 shows a situation in which the document management agents 22, 26 are located in their respective client devices 12, 14, in an alternative embodiment of the invention, the document management agents may be located in the servers that are accessible by the user computers. For example, in order to be able to send email, a user computer must be connected to an email server computer, and the functionality of the document management agents 22, 26, as described in more detail below, can instead be located in the network email server or servers, as well as in other servers which handle similar requests, such as web servers and file transfer protocol servers.

When the document has been created, and the document movement request has been received, the document management agent software 22 asks the originating user to confirm whether any tracking requirements are to be associated with the document. These originator preferences may for example include a requirement that the document should not be sent to recipients outside a specified group of recipients, or that it should not be sent outside the organisation running the LAN 16, or that it should be tracked whenever it is moved, or various other options. In addition, the originator preferences may be time dependent. That is, the originator preferences may specify that certain actions are permissible only before a certain time has expired, or only after a certain time has expired, or only within a defined time window.

Although, in this situation, the originator preferences are associated with the document at the time that the document is created, it should be noted that the originator preferences may be associated with the document at a later time, either by the user that created the document, or by another user who had access to the document. In the latter case, the originator preferences may apply only to copies derived from the user who added the originator preferences.

If the originator sets any such requirements, then, in step 44, the document management agent software 22 forms a digest of the document. The digest is a version of the document, which will allow it to be recognized later. The digest could be a complete copy of the document, or could be something derived from the document. Preferably, the digest is formed in such a way that recognition will still be possible, even though the document may have been altered.

At the simplest level, the digest is simply the original document stored in its entirety. In this case, the document can be recognized later by applying conventional similarity tests.

However, from the point of view of reducing the storage requirements, it is advantageous to form a digest that contains less data than the original document. For example, a hash can be formed according to a known technique. If the hash space is large enough, then the possibility of producing two identical hashes from non-identical documents can be set to effectively zero.

An alternative would be to use Bayesian techniques to identify the topmost fifty or so relevant words in the source document and then use these as the digest or a part of the digest. For example, the digest could include both these most relevant words and some other data such as the entire document. Then, when testing a document for recognition, a full comparison for similarity would only be performed on those documents having the same relevant word list.

A further alternative would be to use the technique suggested by Paul Rubin in a document currently available on the Internet at http://groups.google.co.uk/groups?q=paul+rubin&hl=en&lr=lang_en&group=alt.current-events.net-abuse.*&safe=off&selm=phrD4A6lp.LFA%40netcom.com&rnum=6, where a set of overlapping hashes are created for every 15-byte sequence in the document, and then the majority of these are discarded leaving, say 100 values. These are stored in a sorted list which can be used to determine whether the documents contain terms in common.

Once the digest has been formed, in step 44, it is sent, together with the tracking requirements received in step 42, to the server 18, and these are stored in the database 30, in step 50 of the process.

In this illustrated embodiment of the invention, the original document is also sent to the server 18 for storage in the database 30.

Figure 3:
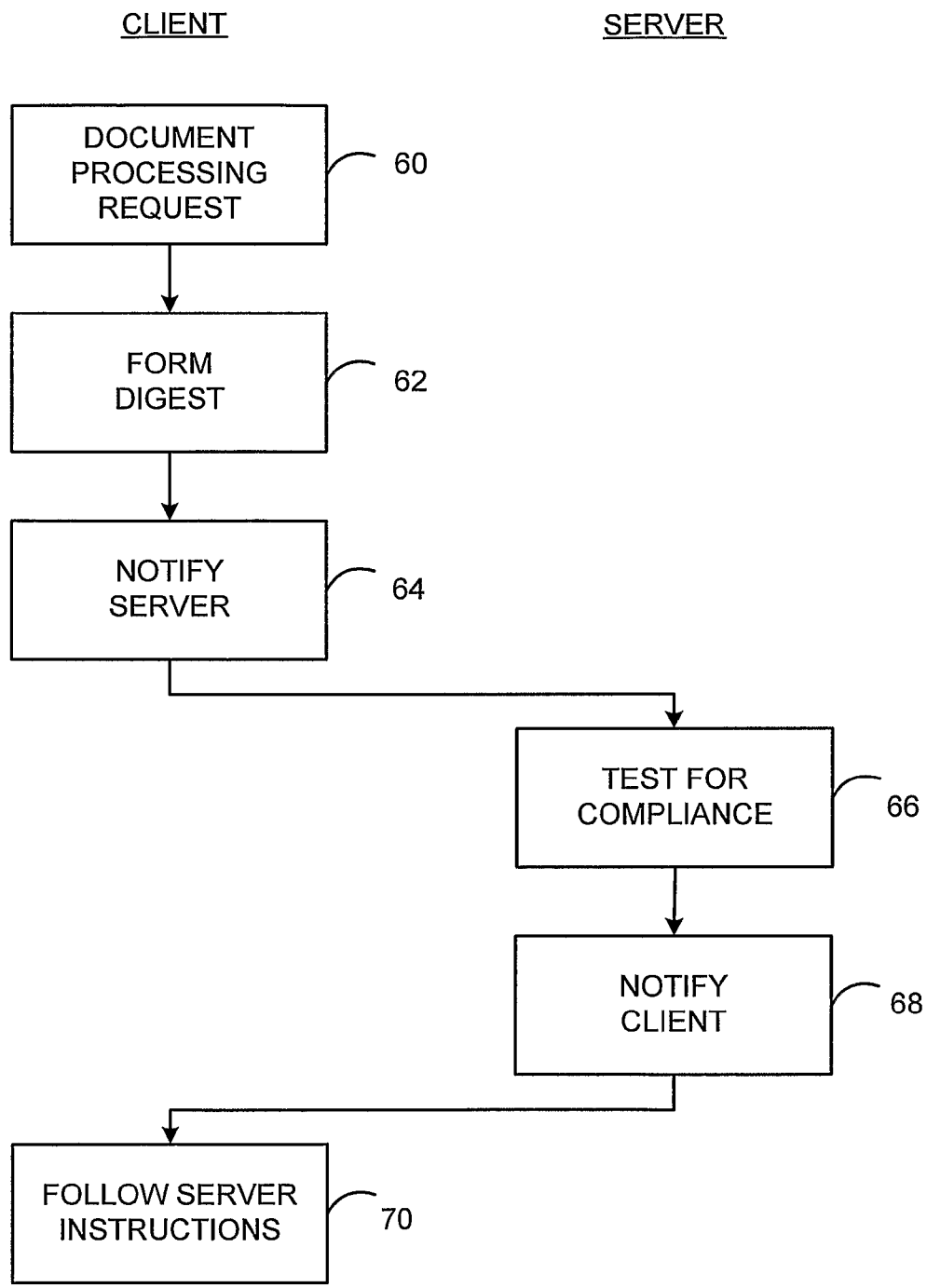
FIG. 3 is a flow chart, showing steps performed in a client device, and in a server, of the computer system of FIG. 1, at a second stage in a process in accordance with an aspect of the present invention.

FIG. 3 is a flow chart, illustrating a second phase of the operation of the system 10, once the document has been made available to a second, recipient, user. Thus, in the illustrated embodiment of the invention, the document is sent to the second user by email. In other embodiments of the invention, or in other uses of this embodiment, the document may be made available on a file server for downloading by the second user, or the second user may be enabled to access the document in any other way.

Although this description assumes that a particular document, to which originator preferences have been applied, has been made available to the recipient, the process is applied whenever a user performs any document processing, and the process includes determining whether the document processing relates to a document that has previously had originator preferences stored in association with it.

In step 60 of the process, a document processing request is made in the application software 24 on the client computer 14. For example, the document processing request may be a request from the user to open a specified document, or to modify the specified document, to save the document to a specific location on the computer system 10, or to save the document to a removable storage device, or to forward an email to a specific email address.

In step 62, the document management agent software 26 forms a digest of the document, using the digest formation technique in use in the system, for example selected from the techniques discussed above.

In step 64, the client computer 14 notifies the server 18 of the digest formed in step 62, the identity of the recipient user, and the form of document processing requested.

In step 66, the server 18 tests whether the document processing request complies with any previously set originator preferences. As a first stage of step 66, the server 18 tests from the digest formed in step 62 whether the document corresponds to any of the documents for which originator preferences have been stored in the database 30.

As mentioned above, in preferred implementations of the invention, the server 18 is able to test not just whether the document is exactly the same any of the documents for which originator preferences have been stored in the database 30, but whether it is a modified version of any of the documents for which originator preferences have been stored in the database 30. Techniques exist for testing for this similarity. In addition, some of this testing can make use of knowledge of document structures. For example, when an email message is forwarded, information about who originally sent it is included, and line markers such as "greater than" signs (>>) are inserted at the start of each line. These can be excluded before the digest is created in step 62, as can any text added by the forwarder before the forwarded text.

As a second stage of step 66, if it is found that the document corresponds to one or more of the documents for which originator preferences have been stored in the database 30, the server 18 tests whether the document processing request complies with the preferences set for that recipient user.

For example, the originator may have set a preference that the document may be forwarded only to recipients within the originator's and recipient's company, or immediate workgroup, or may have set a preference that the document may be stored only to some locations on the network and may not be saved to a removable storage device.

In addition, as mentioned above, the preference may state that certain actions are permissible only at certain times.

Based on the stored preferences, the server 18 therefore determines whether the document processing request complies with those preferences and, in step 68, it notifies the client device accordingly.

In step 70, the client device 12 acts in accordance with the notification received from the server 18. For example, the client device may be able to comply with the document processing request, or it may have to decline the request. Further, in accordance with a preference set by the originator of the document, the client device 14 may notify the originator client device 12 as to any operations performed on the document.

As a result of this, the originator is therefore able to check the operations that have been performed on the documents for which such notifications have been requested.

There is therefore described a system in which it can be determined whether a document processing request complies with any stored preferences relating to the document. Moreover, in particularly advantageous embodiments, the system is able to determine if the document is simply a modified version of a document for which preferences have been stored and, if so, is still able to ensure compliance with those preferences.

These determinations can be made in the server 18, or in the recipient's client computer 14, or can be made between the server 18 and the recipient's client computer 14.

For example, the determinations can be made in the server 18 if the client computer 14 notifies the server 18 of the digest formed in step 62, the identity of the recipient user, and the form of document processing requested. In that case, the server 18 can determine if the digest sufficiently closely matches any of the digests of documents which have associated stored preferences, and, if so, can then determine whether the document processing request complies with the preferences set for that recipient user.

The final determination can be made in the recipient's client computer 14 if, in response to a notification of the name of the document, the server 18 informs the recipient's client computer 14 of the relevant stored preferences and the recipient's client computer 14 can then determine whether the document processing request complies with the preferences set for that recipient user.

The decision making can be shared between the server 18 and the recipient's client computer 14 if, for example, recipient's client computer 14 stores the digests of documents which have associated stored preferences, and then sends the original document to the server 18, together with information about the identity of the recipient user, and the form of document processing requested, if an initial comparison of the digest suggests that the document may in fact be a modified version of a document which has associated stored preferences. If so, the server 18 can then determine, based on a conventional similarity test, whether that is true and, if so, whether the document processing request complies with the relevant preferences.

FIG. 4 illustrates a user interface, by means of which the originator is able to check such operations.

In FIG. 4, the user interface 80 displays a list 82 of documents that have had tracking information applied to them, and a similar list 84 of emails. In the list 82 of documents, the document "Suggestion.txt" 86 is highlighted, indicating that the user has selected this document for more detailed information. On the right hand side 88 of the interface 80, the system then displays (at 90) the originator preference that has been set, and (at 92) the history of where the document has been sent.

Thus, we can see that the document was created by the user FS, and sent by email to the user JD. The user JD saved a copy of the document on her machine, with the asterisk 94 indicating that the saved copy is more or less the same as the original, but has been slightly altered. The user JD sent the slightly altered copy to another user HJ. However, as there is as yet no copy of the document on the user HJ's machine, we can assume that the user HJ has not yet read his email.

There is therefore described a system which allows a user to track movement of a document around an organization, as well as possibly restricting the recipients' ability to process the document. The tracking of the document is useful because it allows a user to discover who has received a copy of a document, for example so that, when an updated version of the document is produced, that updated version can conveniently be sent to all of the recipients.

The invention claimed is:

1. A method of controlling data processing, the method comprising:
   transmitting a message from an originating user to a recipient;

receiving one or more originator preferences relating to data transmitted in the message, wherein the originator preferences have been input by the originating user and the originator preferences are configured to restrict one or more requesting users' processing of the data;

forming a data digest of the data, wherein the data digest comprises storage requirements that are less than or equal to the data;

storing, separate from the data, the originator preferences and the data digest;

in response to receiving a request from a requesting user to process a file that includes file data:

forming a file digest of the file data, wherein the file digest comprises storage requirements that are less than or equal to the file data;

comparing the file digest to the data digest to identify whether the file data satisfies a test for similarity with the data; and in response to determining that the file data satisfies the test:

determining an identity of the requesting user;

determining from the originator preferences whether the requesting user has been restricted from processing the data by the originator preferences; and permitting the requesting user to process the file data only if the requesting user's requested processing is permitted by the originator preferences.

2. A method as claimed in claim 1 further comprising receiving the originator preferences when a created file containing the data is created.

3. A method as claimed in claim 1, wherein said originator preferences indicate permitted recipients of the data.

4. A method as claimed in claim 1, wherein said originator preferences indicate permitted actions to be performed by recipients of the data.

5. A method as claimed in claim 1, wherein said originator preferences indicate locations to which the requesting users are allowed to copy the data.

6. A method as claimed in claim 1, wherein said originator preferences indicate storage devices to which the requesting users are allowed to copy the data.

7. A method as claimed in claim 1, wherein said originator preferences indicate further recipients to which the requesting users are allowed to send the data.

8. A method as claimed in claim 1, wherein a database is associated with a network server, and wherein the originating user and the requesting user are connected to said network.

9. A method as claimed in claim 1, wherein said data digest comprises a hash of said data.

10. A method as claimed in claim 1, wherein permitting access to the data by the requesting user comprises transferring the data from a machine associated with the originating user to at least one machine associated with the requesting user.

11. A method as claimed in claim 1, wherein permitting access to the data by the requesting user comprises saving the data in a created file to a server, and allowing the requesting user to download the created file from the server.

12. A method as claimed in claim 1, wherein the determining whether the requested processing of the data comprises determining whether the requesting user is a permitted recipient of the data.

13. A method as claimed in claim 1, wherein determining whether the requested processing of the data comprises determining whether a requested storage location is a location to which the requesting user is allowed to copy the data.

14. A method as claimed in claim 1, wherein determining whether the requested processing of the data comprises determining whether a requested storage device is a device to which the requesting user is allowed to copy the data.

15. A method as claimed in claim 1 further comprising, after permitting the requested processing, informing the originating user that the requesting user was permitted to process the data.

16. A method as claimed in claim 1, wherein the originator preferences are time dependent.

17. A server computer device, comprising:

at least one processor configured to:

receive one or more originator preferences relating to a first file, in association with a first data digest of a first content of said first file, wherein the first data digest is generated from the first content and the originator preferences comprising information that has been input by an originating user and the originator preferences are configured to restrict one or more requesting users' processing of the first file, wherein the first data digest comprises storage requirements that are less than or equal to the first content of said first file;

receive a notification from a requesting user for processing a second file, in association with a second data digest of a second content of said second file, wherein the second data digest is generated from the second content;

receive a second indication of the identity of the requesting user;

perform a test for similarity between said first data digest and said second data digest;

retrieve the originator preferences, in response to determining the test is satisfied; and permit the processing requested of said second file only when the processing is consistent with the received originator preferences relating to the requesting user as inputted by the originating user.

18. A server computer as claimed in claim 17, wherein being configured to permit the processing comprises being configured to communicate with the originating user's client computer device.

* * * * *